United States Patent
Latchminarine

(10) Patent No.: US 12,507,828 B1
(45) Date of Patent: Dec. 30, 2025

(54) GRILLING DEVICE FOR USE WITH STOVETOPS

(71) Applicant: Chandradai Latchminarine, Richmond Hill, NY (US)

(72) Inventor: Chandradai Latchminarine, Richmond Hill, NY (US)

( * ) Notice: Subject to any disclaimer, the term of this patent is extended or adjusted under 35 U.S.C. 154(b) by 715 days.

(21) Appl. No.: 17/942,577

(22) Filed: Sep. 12, 2022

(51) Int. Cl.
*A47J 37/06* (2006.01)

(52) U.S. Cl.
CPC ................................. *A47J 37/0694* (2013.01)

(58) Field of Classification Search
CPC ..................................................... A47J 37/0694
See application file for complete search history.

(56) References Cited

U.S. PATENT DOCUMENTS

| | | | | |
|---|---|---|---|---|
| 2,099,788 A * | 11/1937 | Ames | ....................... | F24B 1/003 126/275 R |
| 3,212,426 A * | 10/1965 | Lewus | ..................... | A47J 27/04 126/369 |
| 3,301,172 A * | 1/1967 | Longo | ................... | A47J 37/067 99/446 |
| 4,729,297 A * | 3/1988 | Iranzadi | ................... | A47J 37/01 99/425 |
| 4,976,252 A * | 12/1990 | Cianciola | ................. | A47J 37/01 126/41 R |
| 5,276,307 A * | 1/1994 | Higgins | ............... | A47J 37/0709 219/541 |
| 5,682,873 A * | 11/1997 | Chambers | ............... | F24B 1/003 126/261 |
| 7,059,318 B2 * | 6/2006 | Cornfield | ............ | A47J 37/0704 126/41 R |
| D610,391 S * | 2/2010 | Junkins | ......................... | D7/354 |
| 9,554,671 B2 | 1/2017 | Poon | | |
| 10,702,098 B2 * | 7/2020 | Chatot | .................... | F24C 15/16 |
| 2009/0301463 A1 * | 12/2009 | Park | ........................ | A47J 36/34 126/25 R |
| 2015/0265097 A1 * | 9/2015 | Poon | ................... | A47J 37/0694 99/425 |

FOREIGN PATENT DOCUMENTS

| | | | | | |
|---|---|---|---|---|---|
| CN | 101612007 B | * | 9/2011 | .......... | A47J 37/0704 |
| KR | 20120115866 A | * | 10/2012 | .......... | A47J 37/0694 |
| KR | 101816526 B1 | * | 1/2018 | .......... | A47J 37/0786 |
| KR | 20240148219 A | * | 10/2024 | .......... | A47J 37/0694 |

* cited by examiner

*Primary Examiner* — Woody A Lee, Jr.
(74) *Attorney, Agent, or Firm* — Sanchelima & Associates, P.A.; Jesus Sanchelima; Christian Sanchelima

(57) ABSTRACT

A grilling device for use with stovetops including a drip tray assembly, a grill assembly and a cover assembly. The drip tray assembly includes a housing and a tray. The tray is inside of the housing. The housing is placed surrounding a stove burner. The stove burner produces heat. The grill assembly includes a grill. The grill can be placed on top of the housing. The heat is transmitted from the stove burners to the surface of the grill. The tray receives any liquid that slides from the grill. The cover assembly includes a lid. The lid can be used to cover the grill to prepare smoked food.

1 Claim, 3 Drawing Sheets

GRILLING DEVICE FOR USE WITH STOVETOPS

BACKGROUND OF THE INVENTION

1. Field of the Invention

The present invention relates to a grilling device for use with stovetops and, more particularly, to a grilling device for use with stovetops that allows the grill food while collecting the grease that the food may have

2. Description of the Related Art

Several designs for grilling devices have been designed in the past. None of them, however, include a cover which makes the process of cooking faster by covering the food while cooking.

Applicant believes that a related reference corresponds to U.S. Pat. No. 10,702,098 issued for a cooking assembly with a drip tray and cooking stone. Applicant believes that another related reference corresponds to U.S. Pat. No. 9,554,671 issued for a grilling apparatus with a grill member and collection basin which can be placed over the burner on a stove and may also include a cover. None of these references, however, teach of a grilling device for use with indoor stovetops that is comprised of a cast iron grilling surface which contains a dripping collection area and cover assembly which is configured to be placed over the burners of a conventional stove top.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a grilling device for use with stovetops that includes a drip tray to collect grease while cooking.

It is another object of this invention to provide a grilling device for use with stovetops that includes a cooktop to grill food therein, the cooktop having openings to ease harvesting of the grease.

It is still another object of the present invention to provide a grilling device for use with stovetops that includes a cover, the cover covers the food to cook faster, the cover has an opening to allow smoke flow out.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
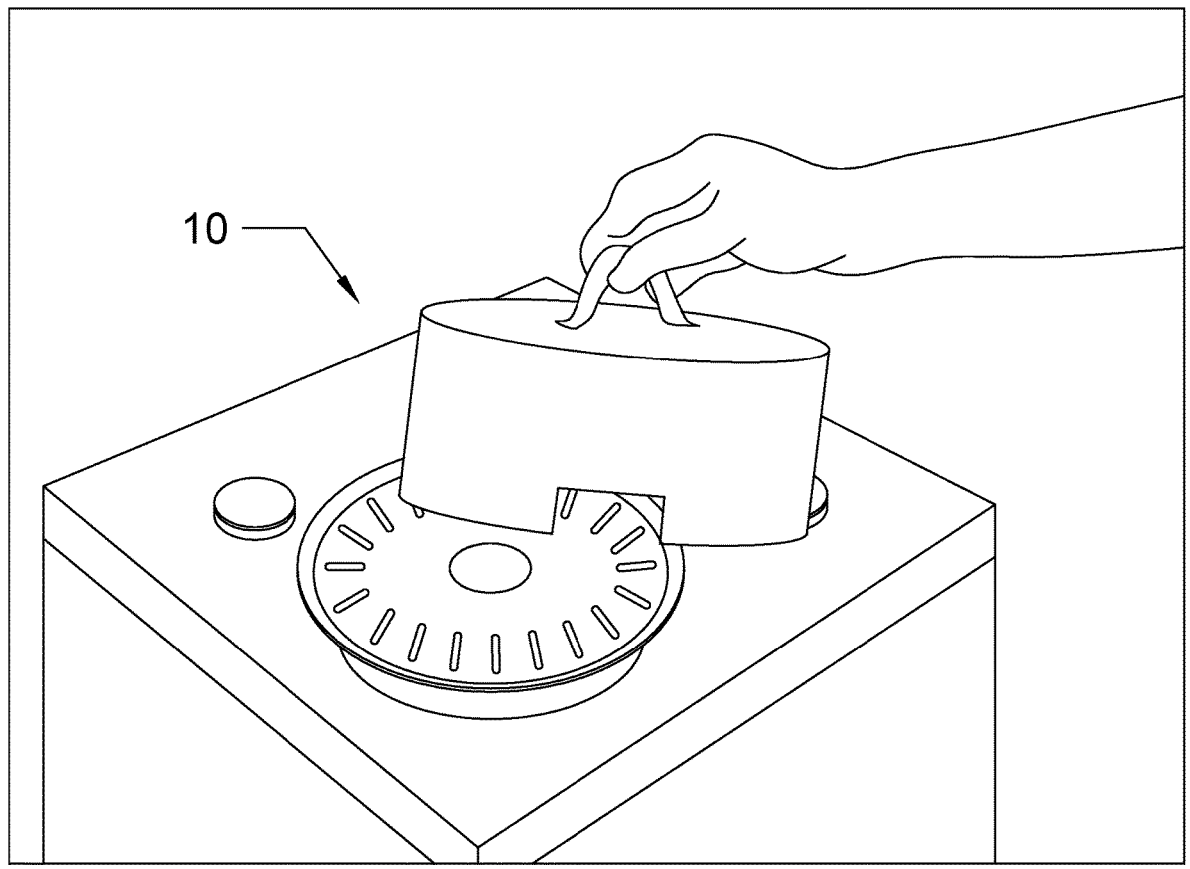
FIG. 1 represents an isometric operational view of the present invention 10 wherein a user is placing a lid 62 over the drip tray assembly 20.
Figure 2:
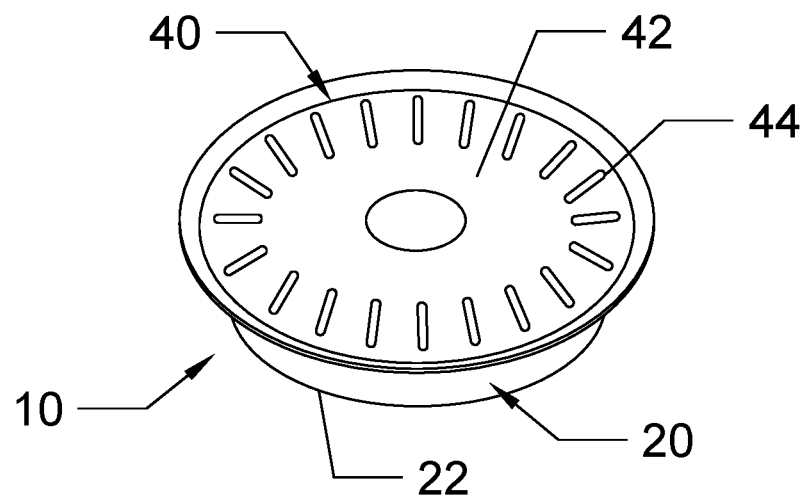
FIG. 2 shows an isometric view of the grill assembly 40 over the drip tray assembly 20.
Figure 3:
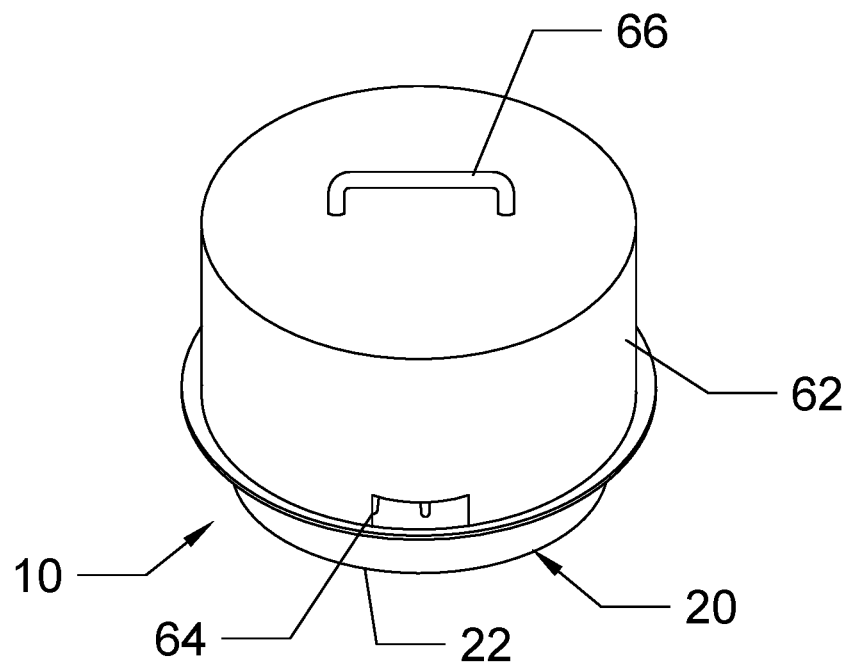
FIG. 3 is an illustration of an isometric view of the present invention 10.

Referring now to the drawings, where the present invention is generally referred to with numeral 10, it can be observed that it basically includes drip tray assembly 20, a grill assembly 40 and a cover assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The drip tray assembly 20 may include a housing 22, a tray 24 and an opening 26. The housing 22 may substantially have a tapered cylindrical shape. It also may be suitable for the housing 22 to have a cylindrical shape, a cuboid shape, or any other suitable shape. The housing 22 may be made of stainless steel, titanium, aluminum, copper, or any other resistant material known in the prior art. The housing 22 may be heat resistant. The housing 22 may have an anti-rust layer. The housing 22 may be hollow. The housing 22 may have lateral sides. The housing 22 may have low thermal conductivity. It may be suitable for the interior of the housing 22 to have a thermal insulation layer.

The tray 24 may be inside of the housing 22. The tray 24 may diagonally extend from a bottom portion of the housing 22 to a central portion of the housing 22. The tray 24 may define an inner reservoir inside the housing 22. The tray 24 may be made of stainless steel, titanium, aluminum, copper, or any other resistant material known in the prior art. The tray 24 may be heat resistant. The Tray 24 may be suitable to receive hot oil. The tray 24 may have low thermal conductivity. It may be suitable for the interior of the tray 24 to have a thermal insulation layer. The tray 24 may be concentrical to the opening 26. The opening 26 may be located on a central inner portion of the housing 22. The opening 26 may have a circular shape, a rectangular shape, a triangular shape, or any other suitable shape. A stove's burner may be introduced through the opening 26. In a preferred embodiment the housing 22 may be placed in a surrounding area of a stove's burner and the stove's burner may transversely go through the opening 26. The housing 22 may be enclosed on top by the grill assembly 40.

The grill assembly 40 may include a grill 42 and concentrical openings 44. The grill 42 may substantially have a circular shape. It also may be suitable for the grill 42 to have a rectangular shape, a triangular shape or any other suitable shape. The grill 42 may be made of stainless steel, titanium, aluminum, copper, or any other resistant material known in the prior art. The grill 42 may be adapted to resist high temperatures. The grill 42 may have a ceramic layer, a polytetrafluoroethylene layer or any other layer for cookware materials. The grill 42 may have an anti-rust layer. The grill 42 may have a high thermal conductivity. The grill 42 may be placed on top of the housing 22. It should be understood that the housing 22 may include elements to prevent the grill 42 to fall into the housing 22.

The grill 42 may have concentrical openings 44. The concentrical openings 44 may have a rounded rectangular-elongated shape. It also may be suitable for the concentrical openings 44 to have an oval shape, a triangular shape, or any other suitable shape. The concentrical openings 44 may be concentrical to a center of the grill 42. In a preferred embodiment a user may place food over the grill 42 and turn on the stove burner, the heat from the stove burner may be transmitted to the surface of the grill 42 to cook the food. Oil or any other liquid may slip through the concentrical openings 44 to the tray 24.

The cover assembly 60 may include a lid 62, a handle 66 and a vent 64. The lid 62 may have a cylindrical shape. It also may be suitable for the lid 62 to have a rectangular prism shape, a triangular prism shape, or any other suitable shape. The lid 62 may be placed over the housing 22. The lid 62 may be used to cover the grill 42. The lid 62 may be made of stainless steel, titanium, aluminum, copper, or any other resistant material known in the prior art. The lid 62 may be heat resistant. The lid 62 may have an anti-rust layer. The lid 62 may be hollow. The lid 62 may have lateral walls and a top wall. The lid 62 may have low thermal conductivity. It may be suitable for the interior of lid 62 to have a thermal insulation layer. The lid 62 may be used to prepare smoked food. The lid 62 may have a vent 64. The vent 64 may be located on the bottom portion for the lateral walls of the lid 62. The vent 64 may have a rectangular shape. It also may be suitable for the vent 64 to have a triangular shape, a circular shape, or any other suitable shape. The vent 64 may be used to release heat air from inside of the lid.

Figure 4:
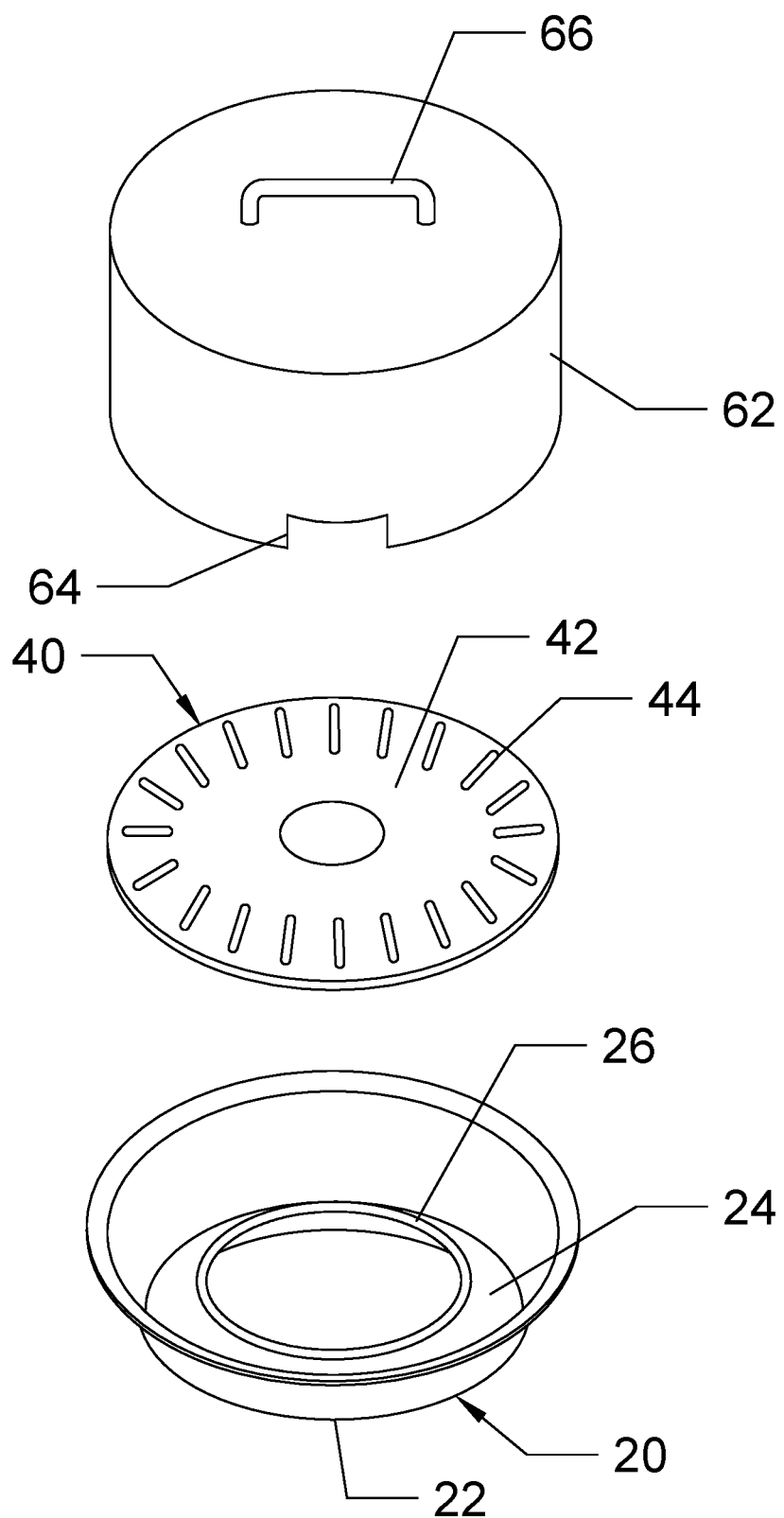
FIG. 4 illustrates an exploded view of the present invention 10. The present invention 10 includes a drip tray assembly 20, a grill assembly 40 and a cover assembly 60.

The handle 66 may be located on an uppermost end of the lid 62. The handle 66 may be made of stainless steel, titanium, aluminum, copper, or any other resistant material known in the prior art. The handle 66 may be heat resistant. The handle 66 may have low thermal conductivity. It may be suitable for handle 66 to have a thermal insulation layer. The handle 66 may be used to safely detach the lid 62 from the housing 22. As shown in FIG. 4 the cover assembly 60 is detachable from the grill assembly 40 and the grill assembly 40 is detachable from the drip tray assembly 20. The present invention 10 may be used as a stovetop which can collect oil and liquid to prevent dirty a stove.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A grilling device for use with stovetops, consisting of:
a drip tray assembly, wherein said drip tray assembly includes a housing, an opening and a tray, said housing is hollow, said opening and said tray are inside said housing, said tray is inside of said housing, said tray diagonally extends from a bottommost edge of said housing to a central inner portion of said housing, wherein said housing has a tapered cylindrical shape with lateral sides, wherein said tray is concentrical to said opening, said opening is in said central inner portion, said opening is capable of receiving a stove burner therethrough, said housing is placed in a surrounding area of said stove burner, said stove burner is capable of producing heat;
a grill assembly, wherein said grill assembly includes a grill, said grill has concentrical openings, wherein said concentrical openings have a rounded rectangular-elongated shape and are concentrical to a center of said grill, said grill is adapted to be placed in abutting contact with an uppermost edge of said housing, said grill is capable of transmitting said heat from said stove burner to an upper surface of said grill, wherein said concentrical openings are capable of receiving therethrough a slipping liquid, said tray is configured to receive said slipping liquid from said grill; and
a cover assembly, said cover assembly includes a lid, a handle and a vent, wherein said lid has a cylindrical shape with lateral walls and a top wall, said lid is hollow, said lid is configured to cover said grill to prepare smoked food, said lid is in abutting contact with said uppermost edge of said housing, said handle is capable of being used to remove said lid from said housing, wherein said handle is located on an uppermost end of said lid, wherein said vent is located on a bottom portion of said lateral walls of said lid, said vent is configured to vent hot air from inside of said lid.

* * * * *